United States Patent [19]

Alvarez

[11] Patent Number: 4,847,494
[45] Date of Patent: Jul. 11, 1989

[54] RADON TESTING PACKAGE AND METHOD
[76] Inventor: Bernard V. Alvarez, P.O. Box 2000, Arden, N.C. 28704
[21] Appl. No.: 114,088
[22] Filed: Oct. 27, 1987
[51] Int. Cl.⁴ .............................................. G01T 1/00
[52] U.S. Cl. ................................... 250/253; 250/255
[58] Field of Search .................... 250/253, 255, 472.1, 250/304

[56] References Cited
U.S. PATENT DOCUMENTS
4,700,070 10/1987 Kovac ............................. 250/472.1

*Primary Examiner*—Carolyn E. Fields
*Attorney, Agent, or Firm*—Dority & Manning

[57] ABSTRACT

A radon detection package permits improved retention of radon, while limiting absorption of moisture which otherwise drives radon off from the package. A pouch of radon absorbing material is supported during a testing period, preferably in a vertical position, and substantially surrounded during such period by a hood-like envelope of radon impermeable material. The hood-like envelope includes an opening, preferably directed downward, which permits access of air and radon to the pouch of radon trapping material. A foldable cardboard wedge is inserted into the opening of the envelope structure for providing a channel along the pouch which admits air and radon into the package so as to controllably expose the pouch. Further in accordance with the present method, the foldable cardboard insert may be removed upon completion of a testing period, and the envelope-like structure closed around the pouch to form a self-mailer unit, which may be sent to a processing plant for detection of the amount of radon in the pouch.

26 Claims, 5 Drawing Sheets

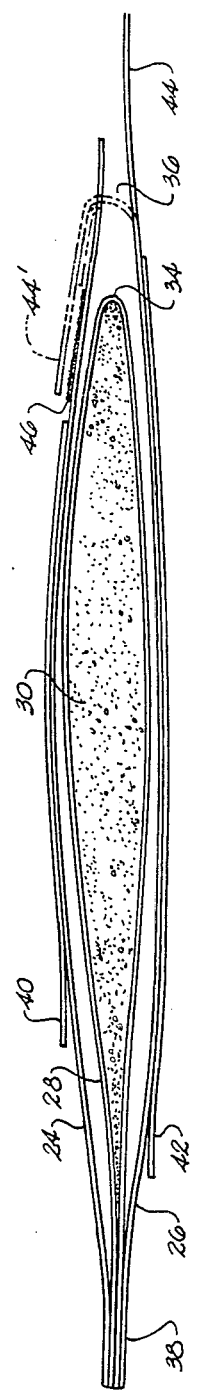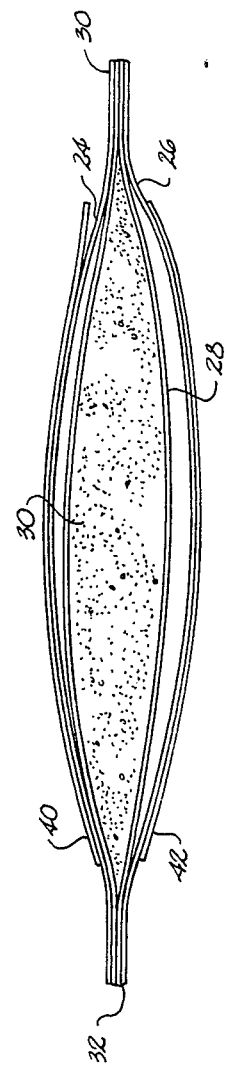

CIRCLE THE AVERAGE TEMPERATURE OF THE TEST LOCATION

| – ↓ | 20 | 30 | 40 | 50 | 60 | 70 | 80 | 90 | 100 | + ↑ | DEG.F |

TO ANALYZE THIS SAMPLE THE LAB MUST KNOW THE TEST PERIOD
YOU <u>MUST</u> CIRCLE A STARTING AND ENDING HOUR AND DAY

MIDNIGHT  ← HOURS →  MIDNIGHT

TEST START  PM  AM     TEST END  PM  AM

NOON                    NOON

DAY OF MONTH

| 1 | 2 | 3 | 4 | 5 | 6 | 7 | 8 | 9 | 10 | 11 | 12 | 13 | 14 | 15 | 16 | 17 | 18 | 19 |

CIRCLE ONE START DAY AND ONE END DAY    IF ENDING NEXT MONTH

| 20 | 21 | 22 | 23 | 24 | 25 | 26 | 27 | 28 | 29 | 30 | 31 | → | 1 | 2 | 3 | 4 | ously

RADON TESTING PACKAGE AND METHOD

BACKGROUND AND SUMMARY OF THE INVENTION

The present invention generally concerns an improved radon detection package, and methods of making and using same.

Radon is a heavy radioactive gaseous element, which exists naturally in the environment, and often resides as ground gas in the soil. Radon levels vary considerably at different sites, and over time on any given site. Because naturally-existing radon levels are now known to sometimes be high enough to cause health concerns, products have fairly recently been introduced to aid in the detection of radon at a particular location. In general, radon detection aides have taken the form of a sealable package of radon absorption material, commonly such as activated carbon (e.g. charcoal), which is situated in an area to be tested and exposed to the ambient air for a testing period. The radon absorption material is later analyzed, such as with spectroscopy or the like, to determine the level of radon, if any, absorbed thereby. In this manner, a given test site, such as a room or basement of a house or building, may be tested for the presence and/or level of radon therein.

Because various factors give rise to variations in naturally-existing radon levels at any one time, such as atmospheric pressure changes (eg. low pressure centers, such as storms, may draw higher levels of ground gas from the soil), typical prior art packages have been used for testing periods of from 6 to 72 hours, and preferably from about two to about three days. Some suggested testing periods extend for seven days. The thought behind a testing period of several days is that an average level of radon for a given test area is determined since radon levels may change radically in the course of only several hours, such average level thus reflecting a truer idea of radon levels at the test site.

While prior art radon testing packages have heretofore been thought to obtain at least satisfactory results with testing periods extending for several days, the present invention recognizes a problem of radon retention over such extended testing periods. In particular, the present invention recognizes that, while radon typically is rapidly taken on or absorbed by commonly used radon absorption materials (eg. activated carbon), the absorbed radon is subsequently driven off from the activated carbon by the absorption of moisture as the test proceeds. It has in fact been determined that, in general, the greater the ambient moisture conditions during a given testing period at the test site, the greater extent to which absorbed radon is driven off from the testing package as the test proceeds beyond a certain time (generally about six hours).

Since the above-noted radon retention problem is more prevalent with higher moisture conditions, testing during summer months is typically more problematic than during winter months since moisture averages can run about 50% higher during the summer months than the winter months.

One typical conventional radon testing package comprises a paper pouch forming a single chamber for receipt of activated carbon or other radon absorbing material. Before and after the testing period, such pouch is retained in a sealed envelope, container, or other like member for shielding the pouch from ambient air and radon. During the testing period, the pouch is vertically suspended or otherwise placed in the testing area, during which time it is fully exposed on all sides to ambient air and radon. Radon is absorbed directly through the paper pouch into the activated carbon. Once the test is complete, and the pouch is returned to a processing location in its shielded container, the activated carbon may be subjected to spectroscopic analysis to determine the amount or level of radon absorbed therein, which level is related to the amount of radon present at the testing site during the testing period.

Obviously, if there is a problem with adequate radon retention by the absorption material, for whatever reasons, the resulting test data will be flawed to the extent that it supposedly indicates a level of radon at the testing site. In particular, if during the testing period radon initially absorbed is subsequently driven off to some degree by the absorption of moisture (as applicant has determined is typically the case with the above-mentioned conventional type of package), subsequent spectroscopic analysis can lead to a false indication of no radon level problem at the test site. Accordingly, it is one object of the present invention to recognize and overcome such disadvantage of the above-mentioned typical conventional radon testing package and testing methodology.

Table 1, infra, provides some data comparing radon retention performance of such conventional package and the improved radon detection package and related methodology disclosed herewith.

In recognition of the foregoing radon retention problem, it is a general object of the present invention to provide an improved radon detection package, particularly having improved radon retention characteristics. It is a more particular object to provide a radon detection package for use in radon testing which generally absorbs and subsequently retains greater levels of radon while reducing the degree of moisture absorbed and retained.

It is another general object of the present invention to provide an improved radon detection package, and testing methodology utilizing same which provides improved counting statistics for spectroscopic analysis. It is a further object of this invention to enable elevated levels of radon retention for improved detection in spectroscopic analysis, which enables more efficient processing of multiple packages by providing relatively higher levels of radon in each such package.

It is yet another object of the present invention to provide an improved radon detection package which has balanced absorption and retention characteristics to permit a practical testing period of about two to about seven days, by having absorbed and subsequently retained during such a testing period an adequate and desireable level of radon for detection purposes without collecting and retaining a deleterious amount of moisture. It is a more particular object of this invention in providing such a package to provide for a controlled amount of air and radon to have access to a pouch or similar container of radon absorption material during a testing period.

It is yet a further object of the present invention to provide such an improved radon detection package which conveniently converts into a self-mailer for return of same by the user to a centralized processing station.

Further objects of the present invention are directed to providing such an improved radon detection package which may be manufactured in accordance with an exemplary preferred method disclosed herewith, and which may likewise be efficiently used for capturing radon with an exemplary method disclosed herewith.

Various constructions and methods may be practiced in accordance with different combinations of features and steps of the present invention disclosed herewith. One exemplary construction is directed to a package for use in testing for the presence of radon in a given area, such package comprising: pouch means for holding absorption material capable of trapping radon gas particles, such pouch means being preferably adapted for support thereof in a substantially vertical orientation in a given area for absorbing radon present in such area; hood means for substantially surrounding the pouch means with a radon-barrier material during testing of a given area, while also providing access to the pouch means via an opening preferably defined generally on the lower side of the hood means whenever the pouch means is situated in a vertical orientation, the opening being adapted for selected sealing thereof after testing of a given area so as to thereafter prevent radon from entering into or escaping from the hood means; and air flow means for maintaining the opening generally open during testing to permit ambient air and radon to have access generally to the bottom and along at least one side of the pouch means during such testing, and for permitting the selected sealing of the opening thereafter.

Yet another particular exemplary embodiment in accordance with the present invention includes a testing package for radon detection, having improved retention of radon and resistance to moisture absorption over the course of a testing period, such package comprising: a generally flat outer pack of radon barrier material, configured so as to define a chamber therewithin and a closable entrance located at one end of the pack for providing selected access to such chamber, such pack being adapted for support thereof in an area to be tested for radon, in a predetermined orientation with the chamber entrance selectively held open to permit the introduction of radon from the given testing area into the chamber; and a pouch formed of material which is porous to radon, the pouch being filled with radon trapping material and situated inside the chamber; whereby any radon present in a given area may be conducted into the chamber through the entrance thereto and trapped within the radon trapping material therein during a testing period, and thereafter retained within the pack by closing the entrance thereof for subsequent detection of any such radon.

While various method steps are disclosed herewith in connection with producing an improved radon detection package in accordance with this invention, one exemplary method, in accordance with this invention, of making an improved radon detection package comprises the steps of: placing a folded sheet of first material between two opposing sheets of a second material; commonly sealing side edges of the sheets so that the two opposing sheets have opposite open ends with a folded edge of the folded sheet being situated adjacent one of the open ends of the two opposing sheets, such folded sheet of first material thereby forming a pouch secured between the two opposing sheets of second material, an open end of which pouch is situated adjacent the other of the open ends of the two opposing sheets; filling the pouch through the open end thereof with radon absorbing material; and commonly sealing the pouch open end and the other open end of the two opposing sheets, whereby such filled pouch is thereby sealed, and is substantially enclosed between the two opposing sheets except for the remaining such one open end of the two opposing sheets; further comprising providing the first material permeable to radon to permit same to enter such filled pouch and be absorbed therein, and providing the second material impermeable to radon so that the pouch can be substantially surrounded with a hood-like structure during a radon testing period and thereafter substantially sealed by closing the one open end of the two opposing sheets.

While various method steps are disclosed herewith in connection with using an improved radon detection package in accordance with ths invention, one exemplary such method of capturing radon present in a given area, in accordance with the present invention, for subsequent detection thereof comprises the steps of: providing a testing package having an internal pouch of activated carbon for absorbing radon, and having an outside hood-like structure for substantially surrounding the pouch while defining at least one sealable opening for providing access thereto, such pouch being comprised of radon-permeable material and such hood-like structure being comprised of radon-barrier material; exposing the pouch for a finite testing period within a given area to be tested for the presence of radon; and sealing the sealable opening at the end of the finite testing period; whereby the activated carbon exposed to radon present in the given area during such testing period is sealed for subsequent detection of radon absorbed therein.

Still further in accordance with this invention, another and preferred exemplary method of capturing and retaining radon present at a selected testing site for subsequent detection thereof comprises the steps of: providing a pouch of radon absorption material; during a testing period, supporting the pouch at a selected testing site within a hood-like structure of radon impermeable material, the structure substantially surrounding the pouch and defining a generally downwardly-directed opening for providing access of ambient air and radon to the pouch; during such testing period, establishing a channel within the hood-like structure, connecting with the structure opening and extending along such structure, and in which the pouch is supported, whereby controlled exposure of the pouch to the ambient air and radon is obtained; and at the close of such testing period, sealing the pouch until time for detection of the radon.

While exemplary constructions and methods in accordance with this invention have been particularly set forth above, those of ordinary skill in the art will appreciate changes to same which may be practiced without departing from the broader teachings of this invention, all of which such variations are intended to come within the scope of the present invention by virtue of present reference thereto.

BRIEF DESCRIPTION OF THE DRAWINGS

A full and enabling disclosure of the present invention, including the best mode thereof, is set forth below, more particularly with reference to the accompanying drawings, in which:

FIGS. 3 and 4 illustrate longitudinal and lateral cross-sections, respectively, of the embodiment illustrated in FIG. 2 as indicated by the respective sectional lines thereof;

Figure 1:
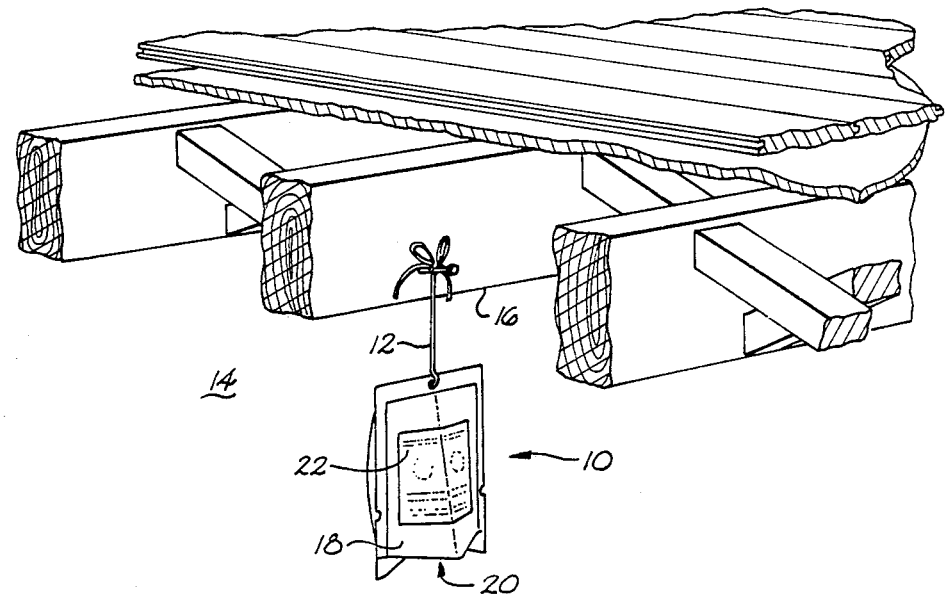
FIG. 1 illustrates an exemplary placement of an improved testing package in accordance with the present invention, during performance of a test therewith.

Repeat use of reference characters throughout the present specification and drawings is intended to represent same or analogous features or aspects of the present invention.

DETAILED DESCRIPTION OF THE PREFERRED EMBODIMENTS

Figures 5, 6:
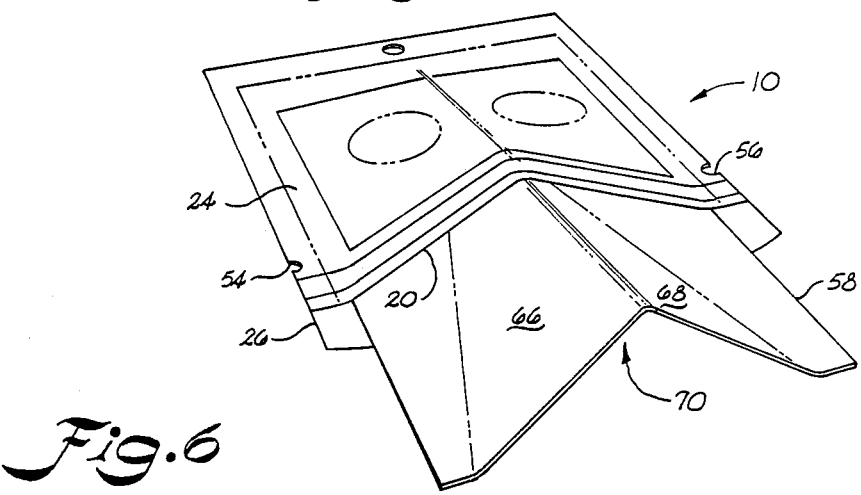
FIG. 5 illustrates exemplary testing period and conditions data indicia which may be provided for use with the embodiment of FIG. 2.
FIGS. 6 and 7 illustrate the introduction and general layout, respectively, of a foldable expander wedge which may be practiced with the present invention.

Exemplary constructions and methodology in accordance with the present invention are more fully described with reference to the accompanying figures. In particular, FIGS. 1-4 are representative of an exemplary improved radon detection package in accordance with the present invention, and methodology relating to both making and using such package. FIG. 5 represents exemplary indicia with which the side of the package may be provided, for recordation of testing period and testing conditions data. The remaining figures relate more particularly to various embodiments and exemplary constructions of foldable wedge inserts which may be used in accordance with the present invention for selectively establishing, preferably during a testing period, a predetermined degree of access by ambient air and radon to a pouch of radon absorbing material which is substantially enclosed or covered by hook-like (radon impermeable) structure which establishes access to such radon absorption material through a generally downwardly-directed opening situated on the lower side of the hood-like structure.

As represented by FIG. 1, an improved radon detection package 10, generally in accordance with a most preferred method according to the present invention, is suspended during a testing period by a string 12 or otherwise supported, in a vertical orientation, in a given testing area 14. As understood by those of ordinary skill in the art, testing area 14 may usually comprise a given room in a house or building, such as the basement thereof, in which case package 10 might be suspended from floor beams 16 within such basement.

Regardless of the testing site location, package 10 preferably comprises a hood-like structure 18 which substantially surrounds and encloses a pouch of activated carbon, the principal access to which is defined by an opening 20, preferably along a lower portion of package 10. As discussed more fully below, the generally flat-pack, but expandable package 10 is influenced during a testing period so as to preferably create an interior channel extending therealong, within which a pouch of radon absorption material is received. Insertion means, discussed more fully below in connection with FIGS. 6-9, may be used to establish and maintain such channel during a testing period, and thereafter removed through opening 20 to permit closure of same.

Once closed, package 10 in a preferred embodiment defines generally an envelope, suitable for mailing with mailing indicia 22 entered directly on a side thereof. Preferably, the hood-like envelope structure of package 10 is radon impermeable so that closure of opening 20 prevents further absorption or desorption of radon after the end of the determined testing period.

Figure 2:
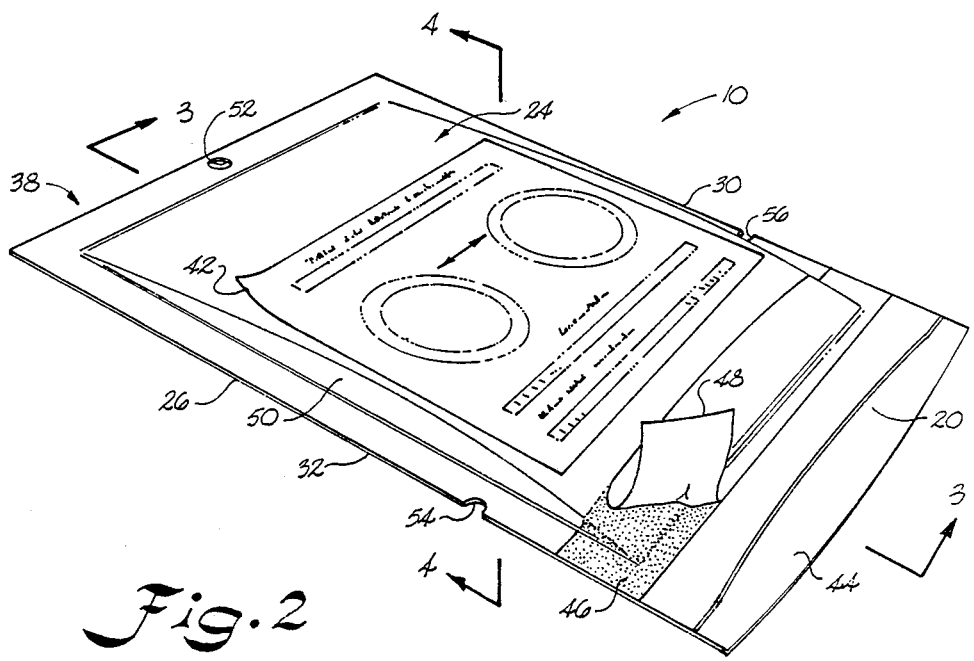
FIG. 2 illustrates a perspective view of an exemplary improved radon detection package.

FIGS. 2-4 illustrate more fully the structure of an exemplary improved radon testing package in accordance with the present invention, as represented by present FIG. 1, including the relationship between the external hood-like structure thereof and the internal pouch for receipt of radon absorption material. While FIG. 1 illustrates package 10 in a relatively expanded condition, FIGS. 2-4 illustrate a more flat (or unexpanded) condition, during which the insert means is removed from opening 20.

The generally flat outer pack of the testing package is formed by two opposing sheets 24 and 26 of generally radon impermeable material, for example, foil-backed paper. The opposing sheets are joined along three common edges thereof, and preferably engage a folded sheet 28 of radon permeable material therebetween. Activated carbon such as charcoal 30 is retained within a pouch formed by folded sheet 28 and the opposing side edge seals. Radon is a relatively small atom which will pass through many polyethylenes, and related products, such as Tyvec, a plasticized paper product of the E. I. DuPont Corporation, Wilmington, Del.

Charcoal 30 is efficiently enclosed within the folded sheet 28 as a result of the present method of making an improved radon detection package disclosed herewith. First, folded sheet 28 of the radon permeable material is situated between the two opposing sheets 24 and 26, which are foil-backed or otherwise treated so as to be radon impermeable. Then, side edges 30 and 32 of the package are commonly sealed, leaving the two opposing sheets 24 and 26 with opposite open ends. A folded edge 34 of folded sheet 28 is situated adjacent one of the open ends 36, which also corresponds with opening 20 (which is preferably downwardly directed during use of the present detection package).

In such an intermediate condition, folded sheet 28, by virtue of its folded edge 34 and the common side edge seals 30 and 32 (see FIG. 4 in particular), forms a pouch which may be filled with charcoal 30 through the yet unsealed end 38, i.e. the upper end of package 10. Following the filling of the pouch with a selected amount of charcoal, such as 19 or 35 grams in several exemplary embodiments, the upper end 38 of package 10 is also commonly sealed, such as by heat sealing or the like (as were common edges 30 and 32), so that charcoal 30 is completely sealed within the pouch formed with folded sheet 28. At the same time, such pouch of charcoal is substantially surrounded by a hood-like structure of radon impermeable material, formed generally by the two opposing sheets 24 and 26.

Of course, variations in the foregoing method of construction, and in the resulting construction itself, may be practiced by those of ordinary skill in the art without departing from the present invention. For example, the amount of charcoal used in a given embodiment may vary, such as over a range from approximately 5 to about 50 grams, or even outside of such range. Furthermore, the approximate dimensions of such a package may vary, but may be particularly about 4×6 inches when same is adapted for use as a self-mailer after completion of a test. In such instance, the two opposing, relatively flat exterior surfaces of package 10 may be provided with an exterior mailing label 40 (or alternatively directly printed with mailing information), and provided with indicia for recording testing period and testing conditions data, also alternatively embodied as a stick-on label 42 or subject matter directly imprinted on to the exterior side of the package.

Further features of both the present construction and present methodology may be practiced in accordance with this invention. For example, one of the sheets 24 and 26 may be provided with an extension 44 relative the other sheet, while the other sheet is provided with adhesive means 46 for securement of such extension 44 upon folding thereof over onto such adhesive means. As illustrated in present FIG. 2, a removable cover 48 or the like may be utilized to cover adhesive means 46 until a testing period is completed, upon which time opening 20 (i.e. 36) is sealed, as generally described above. Present FIG. 3 more fully illustrates the relative position of extension 44 prior to sealing of opening 36 (or 20), and the dotted line position of such extension 44 as represented by 44' of FIG. 3 illustrates the relationship thereof to adhesive means 46 in cooperation therewith for sealing charcoal 30 against further radon exposure inasmuch as extension 44 also is comprised of the same radon impermeable material as is sheet 26 from which it extends.

FIG. 2 also illustrates or represents folds 50 (or otherwise extended areas) which may be utilized to facilitate expansion of package 10, i.e. separation of opposing sheets 24 and 26 thereof, during a testing period, as discussed in greater detail below.

Yet additional features may be incorporated into a particular construction in accordance with the present invention. For example, a hole 52 may be formed in the sealed, marginal edge at the upper end 38 of package 10, to facilitate the suspension there of in a vertical orientation, as discussed above with reference to present FIG. 1. Also, side notches 54 and 56 may be formed in the respective sealed, marginal edges along side edges 30 and 32 of package 10, which notches may function as registration locations for placement of a rubberband or similar resilient member about package 10. With proper selection of paper weights and the like for sheets 24, 26, and 28, a rubberband or other resilient member may comprise air flow means for maintaining opening 20 in the position generally indicated by present FIG. 1, to ensure a predetermined degree of access of ambient air and radon to the radon absorption material within the hood-like structure. Alternative air flow means, particularly embodied as removable insertion means, are discussed in greater detail below with reference to FIGS. 6–9.

FIG. 5 illustrates exemplary testing period and testing conditions data which may be placed on a side of package 10, either through printing or application of a label. Essentially, the information which is recorded by the user relates to the start and stop time, including both hour and day, for the testing period. Preferably, a testing period of about two to about seven days is used, which is generally accepted as a sufficient and desireable testing period to ensure averaged data. Further indicia specified in FIG. 5 relates to the average temperature of the test location, and is also designated by the user with reference to the conditions during the testing period. Since the improved radon testing package in accordance with the present invention may be adapted for use as a self-mailer, indication of the foregoing information directly onto one side of such package advantageously ensures the efficient association of such information with the sample to be analyzed at a centralized location.

FIGS. 6–9 illustrate various embodiments of removable insertion means or members which may be advantageously used during a testing period to hold opening 20 of a testing package 10 in a desired position for access of ambient air and radon from a testing site into the hood means of package 10, i.e. into a channel formed between the two opposing sheets 24 and 26 of such package and where the radon absorption material is supported. If insertable cardboard members or the like are used exclusively for establishing a predetermined channel within package 10 and a predetermined opening for opening 20 thereof during a testing period, then the attention to the weight and strength of sheets 24, 26, and 28, as mentioned above with reference to registration tabs 54 and 56 need not be observed to the same degree. Likewise, registration tabs 54 and 56 may be in some embodiments omitted altogether.

Figure 7:
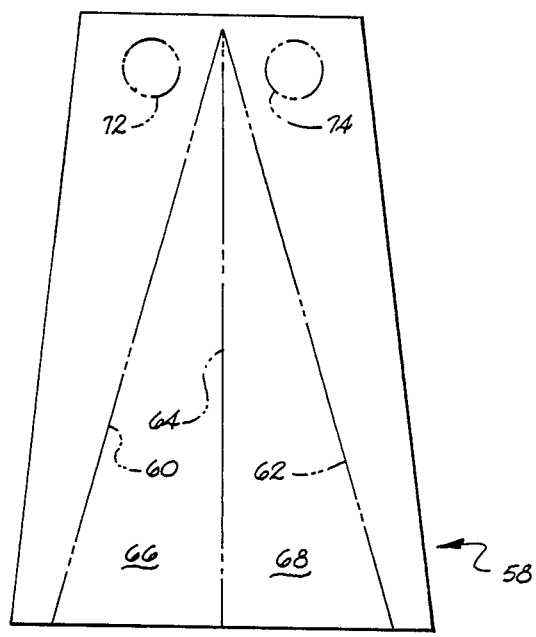

FIG. 7 illustrates one example of a foldable expander wedge which may be used to establish the aforementioned channel within the hood means of package 10 during a testing period. Actual use of such a foldable member is illustrated in present FIG. 6, which shows such a foldable and removable insert means 58 partially inserted into the interior of package 10 through opening 20 thereof. During testing, member 58 is more fully introduced into package 10, as represented by present FIG. 1.

Member 58 may preferably comprise a normally planar cardboard member having angular fold lines 60 and 62, and a central fold line 64. During actual introduction of foldable member 58 into package 10 through opening 20, the two complementary triangular-shaped areas 66 and 68 contribute to a wedging action which progressively separates opposing sheets 24 and 26 to a predetermined and desired extent, while creating a channel 70 through which ambient air and radon may be introduced, preferably along substantially the entire length of package 10. Folded sheet 28 (FIG. 3), which contributes to formation of a pouch means within package 10 for receipt of activated charcoal, may be displaced to one or another side of package 10 by introduction of foldable member 58. In the example represented by present FIG. 6, folded sheet 28 is preferably displaced towards sheet 26 so as to lie adjacent to and be contiguous with channel 70 formed within package 10. As further illustrated by FIG. 7, optional cut-outs 72 and 74, or equivalent features, may be practiced for establishing desired variations in the amount of ambient air and radon which is controllably admitted to the interior of package 10 where the radon absorption material is located.

Figure 8:
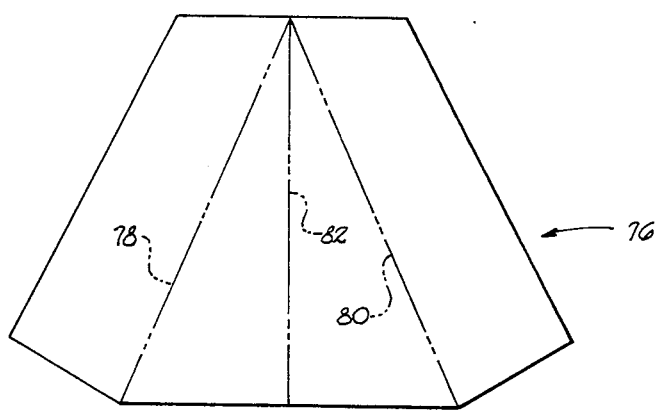
FIGS. 8 and 9 represent a general layout, and folded, perspective view of an alternative embodiment of a foldable wedge for use with the present invention, all as more fully described in accordance with the present methods also disclosed below.
Figure 9:
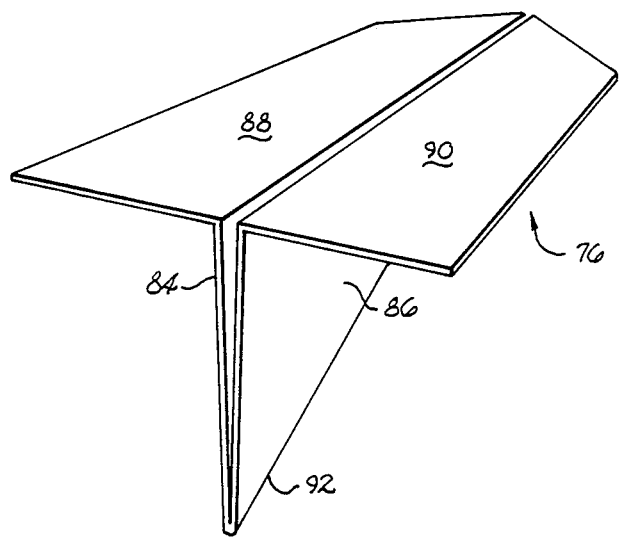

Referring to FIGS. 8 and 9, an alternative removable insert means 76 is illustrated. Foldable member 76 also includes two angled, complementary folding lines 78 and 80, and a central folding line 82, similar to the structure of FIG. 7, but is instead folded generally as is illustrated in present FIG. 9 so as to establish two channels 84 and 86 along the interior of a package 10, upon introduction of the member 76 thereto. FIG. 9 generally illustrates the pre-insertion, folded configuration of foldable member 76, the wings 88 and 90 of which are generally somewhat downwardly folded towards lower base line 92 upon insertion into a package 10.

While several specific exemplary embodiments, especially comprising foldable cardboard expander wedges, have been disclosed, those of ordinary skill in the art will appreciate alternative insert means which may be used for establishing a channel or channels similar or equivalent to that illustrated in present FIG. 1 during a testing period. Once such testing period is complete, the insert means may be withdrawn, and the downwardly disposed opening of package 10 sealed so as to prevent further absorption or desorption of radon, whereupon the self-mailer feature of the present invention may be practiced as discussed above to forward the exposed radon absorption material to a central processing location.

Referring to the attached Table I, test data associated with various package configurations are presented. In particular, test rows A–D refer to the conventional-type radon testing packages mentioned above in the Background and Summary of the Invention portion of the present specification. For the sake of comparison, test data in test row E relates to data taken from an improved radon testing package in accordance with the present invention, having 35 grams of activated carbon enclosed within the pouch means thereof. Similarly, the data in test row F is drawn from use of an improved radon detection package in accordance with the present invention, having 19 grams of activated carbon, i.e. radon absorption material.

As may be noted from the entries of Table I, test rows A–C involve progressively increasing percentage moisture at the start of the test. The counting results taken from spectroscopic analysis are generally reported in the six columns on the right-hand side of Table I, covering testing periods of 6, 12, 18, 24, 48, and 72 hours, respectively. The numbers indicated are in units of counts per minute per gram per pico-curie. Thus, higher numbers indicate the absorption and retention of relatively higher concentrations of radon.

Referring to the results in test rows A–C, it may be seen that radon is absorbed by the radon absorption material, very rapidly, but then desorbed as the tests progress. While not intended to be bound by any such theory, it is believed that the radon is displaced by further moisture absorbed by the charcoal. Ultimately as the tests reach the 1 to 2 day stages (24 and 48 hour columns), the level of radon retained has dropped dramatically from earlier levels. A comparison of test rows A–C further indicates that the failed radon retention phenomenon generally increases in relation to the amount of moisture present in the environment. Thus, the present invention recognizes that, generally speaking, wetter testing conditions lead to greater radon retention problems.

A comparison of test rows D–F illustrates the accomplishment of improved radon retention and moisture absorption inhibition which is a general object of the present invention. Test row D involved the same type of conventional-type radon testing package as was used in the test for rows A–C, albeit at the indicated generally lower starting moisture level. The resulting count data indicates the same problem (more slowly developing due to lower moisture levels), of failure to retain radon. Since charcoal based radon testing periods are generally preferred in a range of from about two to about seven days and since practical lower limits of spectroscopic detection analysis are generally about 0.2 pico-curies, it is demonstrated that even initially relatively low levels of moisture in the environment can cause a highly significant loss of radon during the course of a normal testing period. Note that such radon loss phenomenon eventually occurs in test row D despite the fact that much higher levels of radon were initially achieved with the testing package. Hence, the failure to retain radon, rather than merely the inability to initially absorb radon, jeopardizes the entire testing process.

By contrast, the test results of improved radon testing packages in accordance with the present invention, test rows E and F, surprisingly yield significantly enhanced radon retention characteristics. For example, extending out for a 72 hour testing period, packages in both test rows E and F retain at least two times (row F) and nearly 4 times (row E) the level of radon counts as the other tested radon detection packages. Such test data is respresentative of the presently disclosed construction and methodology achieving the objects of improved radon retention expressed in the Background and Summary of the Invention section of the present specification.

While specific exemplary embodiments of both the present improved radon detection package and the methodology related thereto have been disclosed in detail, the foregoing description is intended by way of example and explanation only, and is not intended to limit the present invention. Also, it is to be well understood that those of ordinary skill in the art will appreciate various modifications to the presently disclosed constructions and variations in the particular methodology outlined herein, all of which variations and modifications may be practiced without departing from the broader spirit and scope of the present invention. All such modifications and variations are intended to come within the scope of this invention, which is set forth more particularly in the appended claims.

TABLE I

| TEST | % MOISTURE TEST START TEST LENGTH IN HOURS | % MOISTURE TEST END | | | | | | COUNTS PER MIN PER GM PER PCURIE | | | | | |
|---|---|---|---|---|---|---|---|---|---|---|---|---|---|
| | | 6 | 12 | 18 | 24 | 48 | 72 | 6 | 12 | 18 | 24 | 48 | 72 |
| A | 7.8 | 13.7 | 16 | 19.6 | 20 | 24.8 | 25 | 4.026 | 3.536 | 2.441 | 2.284 | .966 | .9 |
| B | 12.6 | 17.1 | 19.6 | 20.9 | 23 | 25 | 25 | 2.977 | 2.467 | 1.759 | 1.593 | .964 | .9 |
| C | 20.5 | 22.9 | 23.7 | 24.5 | 24.7 | 25 | 25 | 1.443 | 1.308 | 1.092 | .947 | .874 | .849 |
| D | 2.2 | 11.4 | 16.2 | 18.7 | 20.1 | 24.3 | 25 | 5.602 | 4.183 | 2.923 | 2.284 | 1.056 | .81 |
| E | 2.2 | 4.5 | 4.5 | 6.2 | 7.2 | 11.6 | 15.7 | 2.895 | 4.07 | 5.038 | 5.408 | 5.364 | 3.585 |
| F | 2.2 | 3.5 | 7 | 9 | 8.4 | 15.5 | 19.3 | 2.837 | 5.506 | 5.963 | 5.392 | 3.506 | 2.171 |

What is claimed is:

1. A package for use in testing for the presence of radon in a given area, said package comprising a generally flat, flexible construction including:
   pouch means for holding absorption material capable of trapping radon gas;

hood means for substantially surrounding said pouch means with a radon-barrier material during testing of a given area, while also providing access to said pouch means via opening means defined therein, with said opening means provided for selected sealing thereof after testing of a given area; and movable air flow means for maintaining said opening means generally open during testing to permit ambient air and radon to have access along at least one side of said pouch means during such testing, and for being moved and permitting said selected sealing of said opening means thereafter.

2. A package as in claim 1, wherein said air flow means includes removable insertion means for insertion into said hood means generally along its length and through said opening means thereof so as to establish a preselected amount of separation between said pouch means and said hood means adequate for the introduction of ambient air to said pouch means.

3. A package as in claim 2, wherein:

said pouch means comprises a generally planar-shaped container formed from plasticized paper, generally porous to air and radon but not porous to absorption material contained therein;

said absorption material comprises an activated carbon based product; and said hood means comprises a generally flat, expandable envelope-type structure of foil-backed material for receiving said pouch means therein.

4. A package as in claim 3, wherein:

said hood means further includes adhesive material situated along one exterior edge of said hood means adjacent said opening means thereof; and said opening means includes one extended side for being folded over and sealed against said adhesive material for sealing said opening means, and forming said package into a self-contained mailer; and wherein two outer side of said envelope-like structure bear indicia on one such outer side for indication of testing period data and conditions with which said package was used, and bear on the other such outer side mailing information therefor.

5. A package as in claim 1, wherein said pouch means holds a predetermined amount of said absorption material in an approximate range of from about 5 grams to about 50 grams thereof.

6. A package for use in testing for the presence of radon in a given area, said package comprising:

pouch means for holding absorption material capable of trapping radon gas;

hood means for substantially surrounding said pouch means with a radon-barrier material during testing of a given area, while also providing access to said pouch means via opening means defined therein, with said opening means provided for selected sealing thereof after testing of a given area; and air flow means for maintaining said opening means generally open during testing to permit ambient air and radon to have access along at least one side of said pouch means during such testing, and for permitting said selected sealing of said opening thereafter; wherein said air flow means includes removable insertion means for insertion into said hood means generally along its length and through said opening means thereof so as to establish a preselected amount of separation between said pouch means and said hood means adequate for the introduction of ambient air to said pouch means; and wherein said insertion means comprise foldable wedge inserts for insertion into said hood means through said opening means thereof for spreading opposing sides of said hood means so as to ensure ambient air access to said pouch means contained therein.

7. A package for use in testing for the presence of radon in a given area, said package comprising:

pouch means for holding absorption material capable of trapping radon gas;

hood means for substantially surrounding said pouch means with a radon-barrier material during testing of a given area, while also providing access to said pouch means via opening means defined therein, with said opening means provided for selected sealing thereof after testing of a given area; and air flow means for maintaining said opening means generally open during testing to permit ambient air and radon to have access along at least one side of said pouch means during such testing, and for permitting said selected sealing of said opening means thereafter;

wherein said air flow means includes relatively rigid, angled wing members forming an expander wedge insertable through said opening means into said hood means for spreading same on an angle to permit ambient air and radon to have controlled access to said pouch means during testing by establishing a generally predetermined channel between the exterior of said pouch means and the interior of said hood means substantially along the length of said package.

8. A package for use in testing for the presence of radon in a given area, said package comprising:

pouch means for holding absorption material capable of trapping radon gas;

hood means for substantially surrounding said pouch means with a radon-barrier material during testing of a given area, while also providing access to said pouch means via opening means defined therein, with said opening means provided for selected sealing thereof after testing of a given area; and air flow means for maintaining said opening means generally open during testing to permit ambient air and radon to have access along at least one side of said pouch means during such testing, and for permitting said selected sealing of said opening means thereafter; wherein said hood means comprises an envelope-type construction of generally two opposing sheets of foil-backed paper joined along three common edges thereof, with said opening means being defined along opposite non-sealed edges of said two opposing sheets; and said air flow means comprises an insertable member for insertion into said envelope-type structure through said opening means thereof for controlled separation of one of said opposing sheets from said pouch to form a channel therebetween along substantially the length of said envelope-type construction, with said pouch means received within such channel during testing with said package for the presence of radon.

9. A testing package for radon detection, having improved retention of radon and resistance to moisture absorption over the course of a testing period, said package comprising:

a generally flat, flexible outer pack of radon barrier material, configured so as to define a chamber therewithin and a closable entrance located at one end of said pack for providing selected access to said chamber, said pack providing means for support thereof in an area to be tested for radon, with selectively held open to permit the introduction of radon from the given testing area into said chamber; and a pouch formed of material which is porous to radon, said pouch being filled with radon trapping material and situated inside said chamber;

wherein any radon present in a given area may be conducted into said chamber through said entrance thereto and trapped wihtin said radon trapping material therein during a testing period, and thereafter retained within said pack by closing said entrance thereof for subsequent detection of any such radon.

10. A testing package as in claim 9, further including insert means for selected insertion thereof into said pack chamber, wherein opposing sides of said pack are spread to permit air to enter said chamber.

11. A testing package as in claim 10, wherein said insert means comprises a foldable, wedge-shaped construction of generally rigid material for being inserted into said pack substantially along the full length of said chamber defined therein, and providing support structure for said spreading of opposing sides of said pack, said foldable construction being removable after completion of a testing period to permit closing of said pack entrance.

12. A testing package as in claim 9, wherein:
said pack comprises two generally planar, rectangular sheets of foil-backed material situated in an overlapping relationship and joined along three common edges thereof, with a fourth common edge thereof being unsealed for defining said closable entrance of said pack; and wherein said pouch comprises a folded sheet of plasticized paper secured within said pack chamber by at least two opposing joined edges of said pack.

13. A testing package as in claim 9, wherein said pack further includes an extended planar member adjacent said closable entrance on one side of such entrance, and closure means on the other side of said closable entrance for cooperating with said extended planar member for selected closure of such entrance, wherein said pack with said entrance closed is usable as a mailing envelope, with one side of said generally flat outer pack providing space for mailing information indicia thereon.

14. A testing package as in claim 13, wherein another side of said generally flat outer pack provides testing period indicia means indicative of the length and conditions of a given testing period with which said testing package is used.

15. A testing package as in claim 9, wherein said radon trapping material which fills said pouch comprises from about 5 to about 50 grams of activated carbon.

16. A method of making an improved radon detection package, comprising:
placing a folded sheet of first material between two opposing sheets of a second material;
commonly sealing side edges of said sheets so that said two opposing sheets have opposite open ends with a folded edge of said sheet being situated adjacent one of said open ends of said two opposing sheets, said folded sheet of first material forming a pouch secured between said two opposing sheets of second material, an open end of which pouch is situated adjacent the other of said open ends of said two opposing sheets;
filling said pouch through said open end thereof with radon absorbing material; and
commonly sealing said pouch open end and said other open end of said two opposing sheets, wherein said filled pouch is sealed, and is substantially enclosed between said two opposing sheets except for the remaining said one open end of said two opposing sheets;
further comprising providing said first material permeable to radon to permit same to enter said filled pouch and be absorbed therein, and providing said second material impermeable to radon so that said pouch can be substantially surrounded with a hood-like structure during a radon testing period and thereafter substantially sealed by closing said one open end of said two opposing sheets.

17. A method as in claim 16, further comprising:
providing one of said two opposing sheets with an extension relative the other at said one open end thereof, such extension defining a foldable member; and
providing said other sheet with adhesive for cooperating with said foldable member for selected sealing of said one open end.

18. A method as in claim 16, further comprising:
forming registration notches in said side edges of said sheets, said notches comprising means for cooperating with external tension members for drawing said side edges towards one another, wherein said two opposing sheets may be spread for defining a channel therebetween within which said pouch resides.

19. A method as in claim 16, wherein said first material comprises plasticized paper which is porous to radon gas, said second material comprises a foil-backed material, and said radon absorbing material comprises activated carbon.

20. A method of capturing radon present in a given area for subsequen detection thereof, comprising:
providing a testing package having an internal pouch of activated carbon for absorbing radon, and having an outside generally flat hood-like structure for substantially surrounding said pouch while defining at least one sealable opening for providing access thereto, said pouch being comprised of radon-permeable material and said hood-like structure being comprised of flexible radon-barrier material;
supporting said package for a finite testing period within a given area to be tested for the presence of radon, said package being oriented during such period so that said at least one opening thereof provides access to said pouch; and
sealing said sealable opening at the end of said finite testing period; wherein said activated carbon exposed to radon present in the given area during such testing period is sealed for subsequent detection of radon absorbed therein.

21. A method as in claim 20, wherein:
said testing package is of generally flat-pack, expandable construction, and defines an internal chamber for receipt of said pouch therein; and said supporting step includes spreading said testing package defining said chamber thereof so as to form a channel within said package and extending from at least said one opening thereof substantially along said internal pouch, wherein controlled access of ambient air in a given test area to said pouch is established.

22. A method as in claim 21, wherein said spreading step includes inserting relatively rigid spreading means into said package chamber through said opening thereof so as to form a predefined channel within said hood-like structure, said pouch residing at least adjacent such channel and absorbing radon which enters said package through said opening.

23. A method as in claim 20, wherein said pouch preferably includes from about 5 to about 50 grams of activated carbon, and said finite testing period is preferably in an approximate range of from about two to about seven days.

24. A method as in claim 20, wherein said testing package is of generally flat-pack construction, and forms an envelope suitable for mailing upon sealing thereof, two opposing exterior sides of said package bearing mailing information, and testing period and condition data, respectively.

25. A method as in claim 22, wherein said spreading means comprises a foldable cardboard expander wedge, for initial selected insertion into said package chamber through said opening thereof for supporting said package opposing walls in a spaced condition, and subsequent removal from said chamber for permitting sealing of said chamber opening.

26. A method of capturing and retaining radon present at a selected testing site for subsequent detection thereof, comprising:

providing a generally, flat, flexible pouch of radon absorption material;

during a testing period, supporting said pouch at a selected testing site within a generally flat hood-like structure of flexible radon impermeable material, said structure substantially surrounding said pouch and defining a generally downwardly-directed opening for providing access of ambient air and radon to said pouch;

during said testing period, establishing a channel within said hood-like structure, connecting with said structure opening and extending along said structure, and in which said pouch is supported, wherein controlled exposure of said pouch to said ambient air and radon is obtained; and at the close of said testing period, sealing said pouch against further exposure to ambient air and radon until time for detection of said radon.

* * * * *